May 5, 1936.                J. TJAARDA                2,039,503
                          INSTRUMENT PANEL
                    Filed Nov. 8, 1933        3 Sheets-Sheet 1

INVENTOR:
John Tjaarda
BY
Dike, Calvert & Gray
ATTORNEYS.

May 5, 1936.  J. TJAARDA  2,039,503

INSTRUMENT PANEL

Filed Nov. 8, 1933  3 Sheets-Sheet 2

INVENTOR.
John Tjaarda.
BY Dike, Calver & Gray
ATTORNEYS.

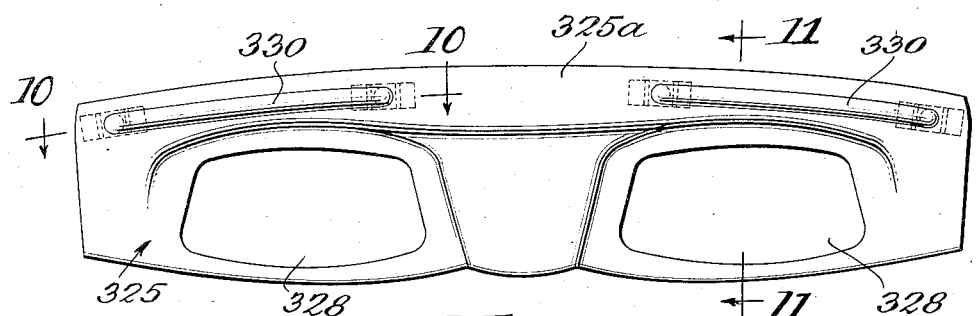
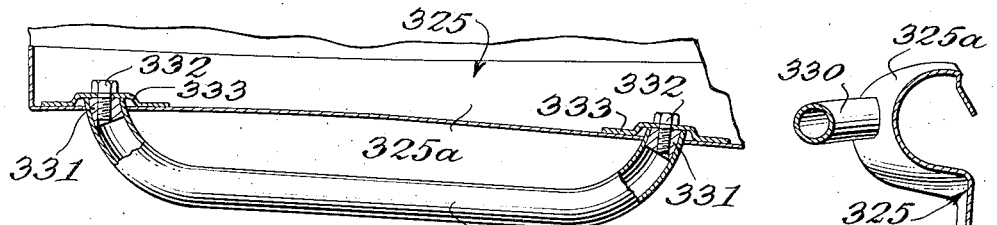
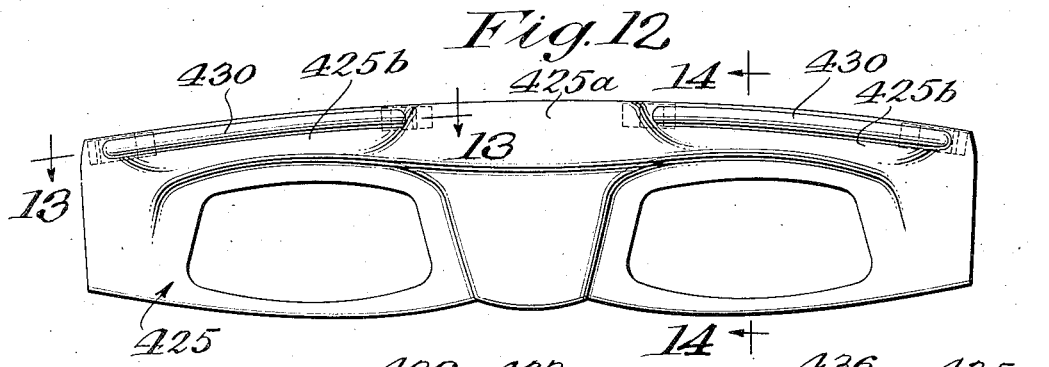
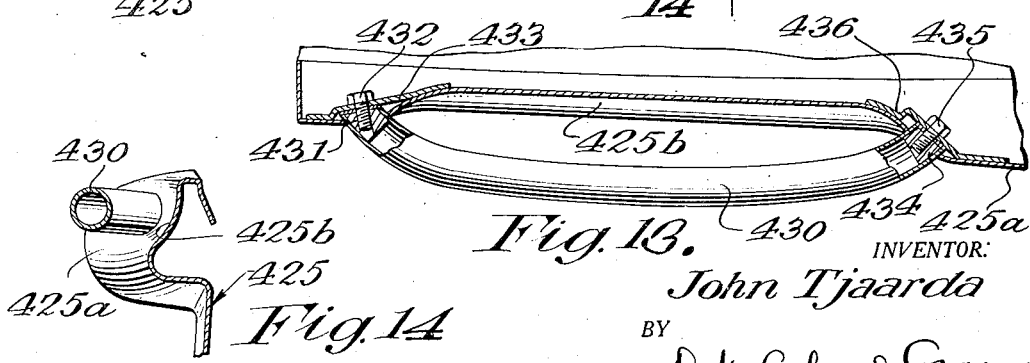

Patented May 5, 1936

2,039,503

UNITED STATES PATENT OFFICE 2,039,503

INSTRUMENT PANEL

John Tjaarda, Birmingham, Mich., assignor to Briggs Manufacturing Company, Detroit, Mich., a corporation of Michigan Application November 8, 1933, Serial No. 697,115

14 Claims. (Cl. 180—90)

This invention relates to automobile or vehicle bodies and more particularly to the instrument or front interior paneling thereof, an object of the invention being to provide an attractive and novel front or instrument panel having means mounted thereon or forming a part thereof adapted to provide a hand grip or handle bar whereby front seat passengers may assist themselves into and out of their seats.

A further object of the invention is to provide on the front finish or instrument paneling of the body a handle or grip bar or bars located within convenient reach of the front seat passengers when seated in the body as well as when entering or leaving the same, said bar or bars being formed or positioned directly on the instrument panel or on the belt bar extending transversely below the windshield opening.

Other objects and advantages of the invention will appear from the following description when taken in conjunction with the accompanying drawings and the novel features thereof will be pointed out and clearly defined in the claims at the close of this specification.

In the drawings:

Fig. 9 is a view similar to Fig. 5 showing another modified form of panel embodying the invention.

Fig. 10 is a horizontal section taken substantially along the line 10—10 of Fig. 9, in the direction of the arrows.

Fig. 11 is a vertical section taken substantially along line 11—11 of Fig. 9, looking in the direction of the arrows.

Fig. 12 is a view similar to Fig. 9 showing another modification of the invention.

Fig. 13 is a horizontal section taken substantially along the line 13—13 of Fig. 12, in the direction of the arrows.

Fig. 14 is a vertical section taken substantially along the line 14—14 of Fig. 12, in the direction of the arrows.

Figure 1:
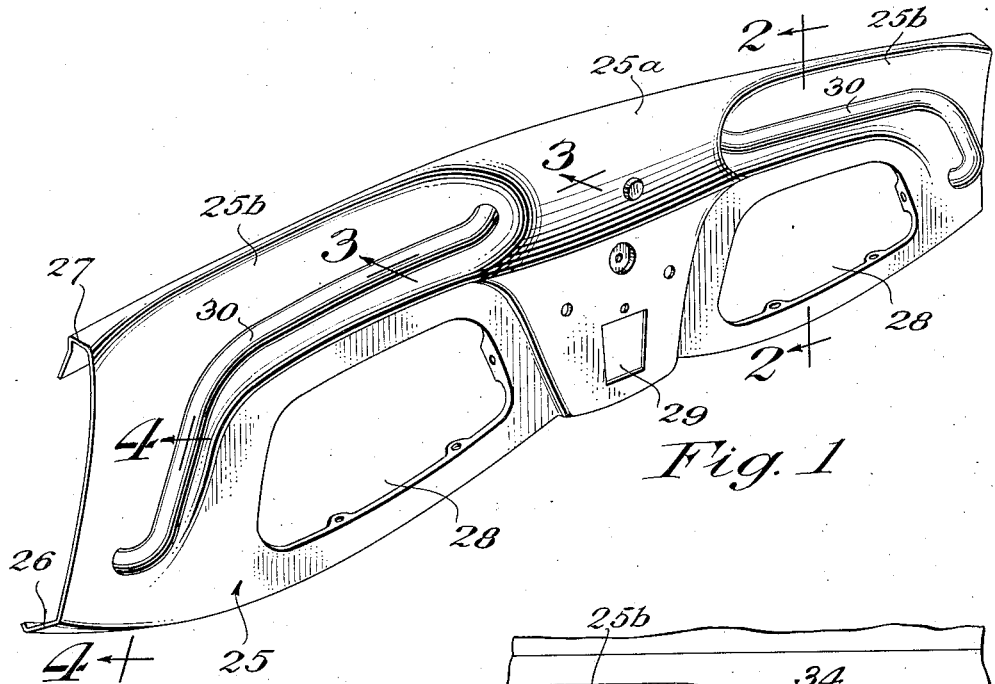
Fig. 1 is a perspective view of an instrument panel embodying the invention.
Figure 3:
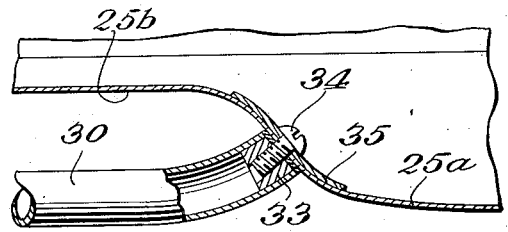
Fig. 3 is a horizontal section taken substantially along the line 3—3 of Fig. 1, looking in the direction of the arrows.
Figure 2:
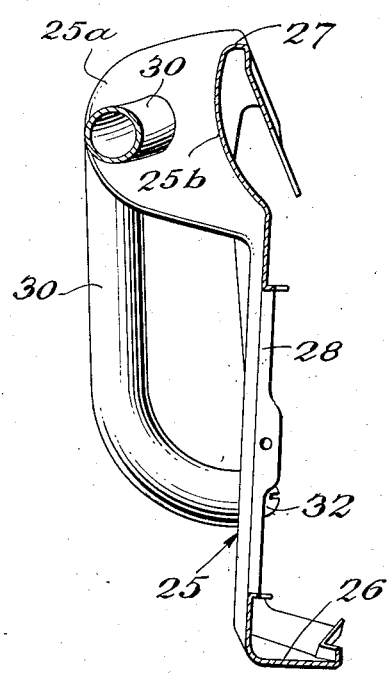
Fig. 2 is a vertical section taken substantially along the line 2—2 of Fig. 1, looking in the direction of the arrows.
Figure 4:
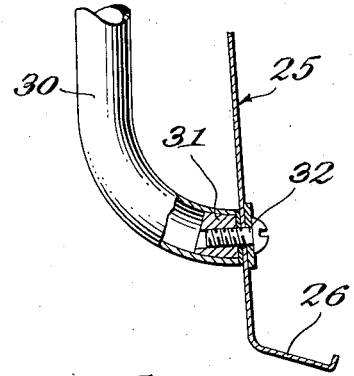
Fig. 4 is an upright section taken substantially along the line 4—4 of Fig. 1, in the direction of the arrows.
Figure 5:
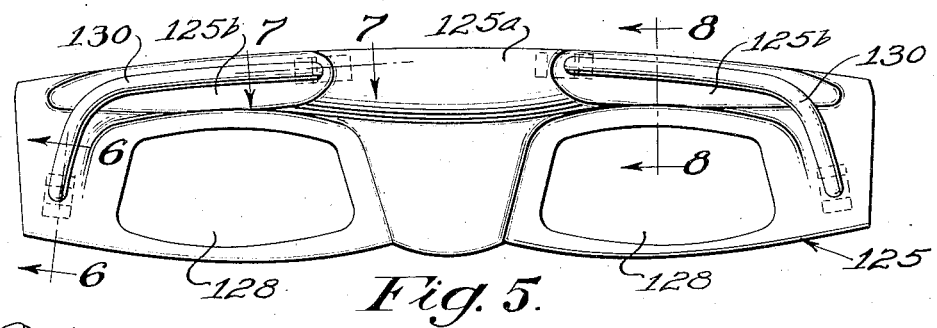
Fig. 5 is a front elevation of a modified form of instrument panel embodying the invention.
Figures 6, 7:
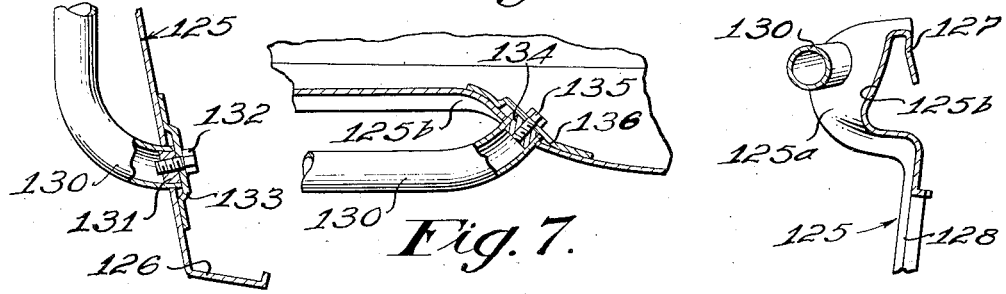
Fig. 6 is an upright section taken substantially along the line 6—6 of Fig. 5, looking in the direction of the arrows.
Fig. 7 is a horizontal section taken substantially along the line 7—7 of Fig. 5, looking in the direction of the arrows.
Figure 8:
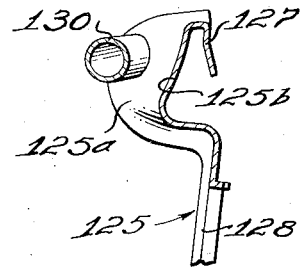
Fig. 8 is a vertical section taken substantially along the line 8—8 of Fig. 5, looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring particularly to Figs. 1 to 4, the instrument board or panel herein illustrated by way of example comprises a panel or body portion 25 having a lower flange 26 and an upper flange 27. The panel is provided with a pair of openings or cut-out portions 28 which are adapted to receive instruments or to provide access to storage compartments. The panel has an additional opening 29 to receive the speedometer. The several other openings in the panel are provided for the passage therethrough of operating levers, etc.

The panel 25 is provided with a centrally located bulge or projecting portion 25a and on opposite sides toward the end of the panel with depressed portions 25b. Secured to the face of the panel and located within and spaced from the depressions 25b, are tubular hand grip members or handle bars 30. The outer or lower end of each bar is secured to the panel by providing the end of the bar with a core or block 31 into which is threaded a screw or bolt 32, there being a pair of washers on opposite sides of the panel through which the screw passes. The inner or upper end of each handle bar is provided with a similar block or core 33 and is secured to the curved portion or bulge 25a by a screw or bolt 34. A curved binding plate 35, shaped to conform to the curvature of the panel, is employed to brace the end of the handle bar. The plate is preferably secured to the panel by spot welding. Thus it will be seen that the bars 30, being spaced rearwardly from the panel, provide means for the occupants of the vehicle to assist themselves into and out of the front seats by grasping one of the bars.

Referring now particularly to Figs. 5 to 8 inclusive, the instrument board or panel comprises a body portion or plate 125 having a lower flange 126 and an upper flange 127. The panel has a pair of openings 128 formed therein to receive instruments or to provide access to storage compartments. The panel is also provided with a centrally located projecting portion or bulge 125a on opposite sides of which the panel has depressed portions 125b. The instrument panel is provided with a pair of spaced tubular handle bars or hand grip members 130 which overlie and extend partly within the depressed portions or areas 125b of the panel. Each bar 130 at its lower or outer end extends through an opening in the panel 125 and is secured by means of a block or core member 131 and a bolt or screw 132 to an angle plate 133, the latter being preferably spot-welded to the inner face of the panel 125. The upper or inner end of each handle bar passes through an opening formed in the bulge 125a and is secured to that portion of the panel by a block or core member 134 and a bolt or screw 135, the bolt passing through an angle plate 136 which is secured to the inner face of the panel by spot welding or in any other suitable manner. It will be noted that the plate 136 is shaped to conform to the curvature of the panel or body member. Thus the handle bars 130 are secured rigidly to the instrument panel and form a fixed part thereof. They serve as hand grips for the occupants of the vehicle front seat to grasp and assist themselves into and out of their seats.

In Figs. 9 to 11 inclusive I have shown an instrument panel 325 generally like those of Figs. 1 to 8 inclusive. The panel of this form is provided with openings 328 for receiving instruments and with a horizontally extending bulge or rounded projecting portion 325a. Mounted upon the bulge is a pair of spaced tubular handle bars 330 secured at opposite ends to the bulge by means of filler blocks or core members 321 and bolts or screws 332, the bolts passing through reinforcing angle plates 333 secured by welding to the inner face of the panel bulge.

Referring now to Figs. 12 to 14 inclusive, the instrument panel 425 therein is provided with a bulge 425a which extends from one side of the panel to the opposite side thereof, the bulge being provided with a pair of spaced depressions 425b. A tubular hand grip bar or member 430 which is slightly curved or bowed outwardly in its length overlies each of the depressions 425b. The outer end of each member 430 passes through an opening in the panel and is secured in position by a filler block or core member 431, a bolt 432 and a metal plate 433, the bolt passing through the plate and into the block. The plate 433 is preferably spot welded to the inner face of the panel. The inner end of each bar extends through another hole or opening in the bulge 425a and is secured to the panel by means of a block 434, bolt 435 and a metal plate 436, the latter being secured to the inner face of the panel by spot welding. It will be understood that the bolt 435 passes through the plate and is threaded into the block 434 to hold the parts in position.

Figure 15:
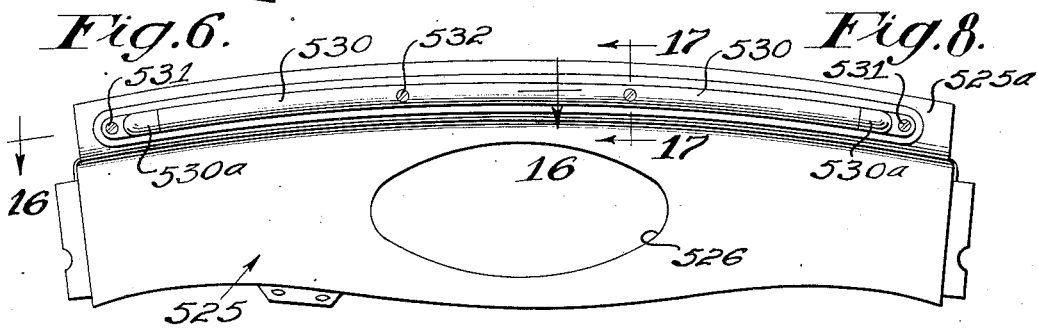
Fig. 15 is a front elevation of another modified form of instrument panel embodying the invention.
Figures 16, 17:
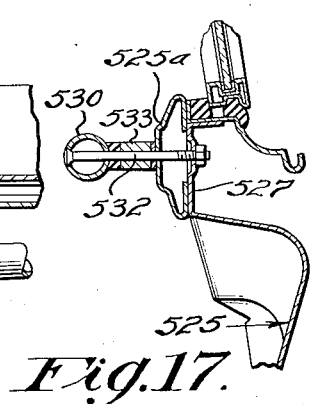
Fig. 16 is a horizontal section taken substantially along the line 16—16 of Fig. 15, looking in the direction of the arrows.
Fig. 17 is a vertical section taken substantially through line 17—17 of Fig. 15, looking in the direction of the arrows.

Another modified form of my invention is shown in Figs. 15 to 17, inclusive. In this form the instrument panel 525 has a central opening 526 formed therein for receiving instruments or the like. The panel is provided with an integral upper flange 527. A finish strip or molding 525a extends across the face of the flange. Secured to the molding is a hand grip or handle bar 530 which is attached at opposite ends to the molding and the panel flange by means of generally cylindrical end pieces or brackets 530a and bolts or screws 531, the end pieces 530a being reduced and press fitted or otherwise secured within the open ends of the bars. The bar 530 is reinforced between its ends and secured to the molding and panel flange by additional bolts or screws 532 which pass through spacer sleeves 533. The sleeves 533 serve to maintain the bar in spaced relation to the panel. It will be noted that common means, namely the bolts 531 and 532 are employed to secure both the handle bar 530 and the finish strip 525a to the panel flange 527. The latter in turn is welded to the belt bar of the front end of the body frame from which the cowl extends forwardly.

From the foregoing it will be seen that I have provided an ornamental and rigid instrument board or panel for a motor vehicle having hand grip members or handle bars which form a fixed part of the instrument panel. By providing such handle bars, it is possible for the occupants of a vehicle to enter and leave their seats with ease and facility.

I claim:

1. An instrument panel for a motor vehicle, comprising a panel formed from a sheet metal stamping and having openings formed therein for receiving and supporting instruments, said panel having elongated depressed portions at predetermined points, and handle bars connected at opposite ends to said depressed portions and having gripping portions spaced from and overlying said depressions.

2. An instrument panel for a motor vehicle, comprising a metal panel having a pair of openings formed therein, and a pair of handle bars positioned above said openings and attached at opposite ends to said panel and having gripping portions spaced from said panel.

3. In a motor vehicle body, a front transversely extending interior panel, a handle bar mounted thereon and having a substantially horizontal portion terminating at its outer end in a downwardly extending portion, said portions being spaced from the face of the panel to provide hand grips.

4. The combination of a motor vehicle instrument panel having a recessed portion separated from a space intended to receive instruments and a handle bar overlying said recessed portion.

5. The combination of a motor vehicle instrument panel having a space intended to receive instruments and a handle bar having a sloping gripping portion in front of the panel and between said space and the end of the panel.

6. The combination described in claim 5 in which said portion of the handle bar slopes up and toward the center of the panel.

7. The combination described in claim 5 in which said portion of the handle bar slopes up and toward the center of the panel at an angle of about 60° to the horizontal.

8. An instrument panel for a motor vehicle comprising a panel and a handle bar secured to said panel and having a portion near the end of the panel in front of and parallel to the face of the panel and rising at an angle of about 60° to the horizontal.

9. An instrument panel for a motor vehicle comprising a panel having a space adapted to receive instruments, horizontal gripping means above said space, and downwardly extending gripping means at each side of said space.

10. An instrument panel as described in claim 9 in which said gripping means lie in front of said panel.

11. An instrument panel for a motor vehicle comprising a panel having a pair of horizontally separated spaces intended to receive instruments and a pair of approximately L-shaped handle bars in front of said panel and attached at opposite ends thereto, each handle bar having a horizontal gripping portion above one of said spaces and a depending gripping portion between said space and the adjacent end of the panel.

12. An instrument panel for a motor vehicle comprising a panel having a space to receive instruments and a handle bar positioned above said space, attached at opposite ends to said panel, and having a gripping portion in front of said panel.

13. An instrument panel for a motor vehicle comprising a panel having a horizontally elongated recess above a space intended to receive instruments and a handle bar having a horizontal gripping portion in front of said recess.

14. An instrument panel for a motor vehicle comprising a sheet metal member having an aperture, a second sheet metal member secured to the back of said first member and extending across said aperture, and a handle bar in front of said first member having one end extending through said aperture and secured to said second member.

JOHN TJAARDA.